US008358036B2

(12) United States Patent
Dozier et al.

(10) Patent No.: US 8,358,036 B2
(45) Date of Patent: Jan. 22, 2013

(54) GENERATOR SET CONTROL SYSTEM

(75) Inventors: Chad Eric Dozier, Washington, IL (US);
Edward Maurer Schroeder,
Germantown Hills, IL (US); Matthew Lee Wagner, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/329,445

(22) Filed: Dec. 19, 2011

(65) Prior Publication Data

US 2012/0089270 A1 Apr. 12, 2012

Related U.S. Application Data

(62) Division of application No. 12/379,038, filed on Feb. 11, 2009, now Pat. No. 8,106,633.

(60) Provisional application No. 61/193,718, filed on Dec. 18, 2008.

(51) Int. Cl.
*H02J 1/00* (2006.01)
*H02J 3/00* (2006.01)
*H02P 9/00* (2006.01)
*H02P 11/00* (2006.01)
*H02H 7/06* (2006.01)

(52) U.S. Cl. .............. 307/84; 307/81; 322/20; 322/22; 322/48

(58) Field of Classification Search .......... 322/20, 322/22, 48; 307/81, 84; *H02J 1/00, 3/00; H02P 9/00, 11/00; H02H 7/06*
See application file for complete search history.

(56) References Cited

U.S. PATENT DOCUMENTS

| 3,463,356 | A | * | 8/1969 | Gatti ........................ 221/213 |
| 3,646,356 | A | | 2/1972 | Hoffman |
| 4,349,744 | A | * | 9/1982 | Reuther et al. .......... 290/40 C |
| 4,488,198 | A | * | 12/1984 | Christen et al. ............. 361/20 |
| 5,706,207 | A | * | 1/1998 | Kurten et al. ............. 700/286 |
| 6,218,813 | B1 | * | 4/2001 | Davis ......................... 322/20 |
| 6,281,664 | B1 | * | 8/2001 | Nakamura et al. ......... 322/22 |
| 6,639,331 | B2 | * | 10/2003 | Schultz ...................... 307/84 |
| 6,653,744 | B2 | * | 11/2003 | Stricker ...................... 290/6 |
| 7,656,060 | B2 | * | 2/2010 | Algrain ...................... 307/84 |
| 8,106,633 | B2 | * | 1/2012 | Dozier et al. .............. 322/22 |
| 2003/0102716 | A1 | * | 6/2003 | Schultz ...................... 307/19 |
| 2006/0076958 | A1 | * | 4/2006 | Deak et al. ................ 324/418 |
| 2007/0257680 | A1 | * | 11/2007 | Klijn et al. ............... 324/418 |
| 2010/0156191 | A1 | | 6/2010 | Dozier et al. |
| 2012/0089270 | A1 | * | 4/2012 | Dozier et al. ............. 700/295 |

* cited by examiner

*Primary Examiner* — John K Kim
(74) *Attorney, Agent, or Firm* — Finnegan, Henderson, Farabow, Garrett & Dunner LLP

(57) ABSTRACT

A control system is provided for use with a plurality of generator sets. The control system may have a bus, an arbitration relay, a switching device, a control module, and first, second, and third discrete signal cables. The control module may be configured to receive a group start signal and initiate startup of a first of the plurality of generator sets, and to generate a signal on the first discrete signal cable based on an operational status of the first of the plurality of generator sets. The control module may also be configured to determine if the second discrete signal cable is active, to activate the second discrete signal cable and the arbitration relay based on the determination, and to activate the switching device to connect the first of the plurality of generator sets to the bus based on a status of the third discrete signal cable.

8 Claims, 2 Drawing Sheets

GENERATOR SET CONTROL SYSTEM

RELATED APPLICATIONS

This is a Division of application Ser. No. 12/379,038, filed Feb. 11, 2009 now U.S. Pat. No. 8,106,633 and claims the benefit of U.S. Provisional Application No. 61/193,718, filed Dec. 18, 2008, which is incorporated herein by reference.

TECHNICAL FIELD

The present disclosure relates to a control system and, more particularly, to a control system for use with a generator set.

BACKGROUND

A generator set (genset) includes a combination of a generator and a prime mover, for example, a combustion engine. As a mixture of fuel and air is burned within the engine, a mechanical rotation is created that drives the generator to produce electrical power. Ideally, the engine drives the generator with a relatively constant torque and speed, and the generator accordingly produces an electrical power output having relatively constant characteristics (frequency, voltage, etc.).

In some applications the electrical power demanded of the genset is greater than can be supplied by a single genset and, thus, multiple gensets are connected in parallel to meet the demands in these situations. Preferably, the power demand remains relatively constant and all available gensets are continuously functional and each produces electrical power at optimum efficiency. However, in practice, the power demand fluctuates as loads are activated and deactivated, thereby requiring the number of gensets online at any given time to vary.

Historically, a single master controller monitored power demand and, based on the demand, either brought additional gensets online or moved them offline to meet the power demand in an efficient manner. Although functionally adequate, the master controller is very expensive and complicated. Thus, a lower cost, simpler alternative is desired.

U.S. Pat. No. 6,639,331 issued to Schultz, on Oct. 28, 2003 ("the '331 patent") discloses a parallel generator power system for connecting a plurality of generator sets to a common bus. The system includes a separate control module associated with each of the plurality of generator sets. And, in response to a signal to start more than one of the generator sets, each control module initiates operation of its associated generator set. When each of the generator sets is operational and ready for connection to the common bus, each generator set sends a ready-to-load signal to its corresponding control module. The first generator set that sends the ready-to-load signal then also energizes an inhibit line connected between all of the generator sets. By energizing the inhibit line, other generator sets are inhibited from simultaneously connected to the common bus. If multiple generator sets are ready-to-load at the same time, the control modules then arbitrate for the right to send the first start command to their generator set that will result in connection of the generator set to the common bus. In other words, all of the control modules as a whole determine which single one of the modules will allow its generator set to connect to the common bus, while inhibiting other generator sets from connecting to the bus. The arbitration process takes the form of hardware, electronics, and software in each connection module.

Although the system of the '331 patent may provide a way to bring multiple generator sets online in a smooth and controlled manner without the use of a master controller, the system may still be suboptimal. That is, the arbitration process may require significant amounts of time and complex controls that can delay connection of a ready generator set to the common bus. Further, should the first generator set determined to be ready-to-load fail to connect to the common bus, the system of the '331 patent provides no backup strategy.

SUMMARY

One aspect of the present disclosure is directed to a control system for use with a plurality of generator sets. The control system may include a bus connected to supply power to an external load, a first discrete signal cable operatively connected to the plurality of generator sets, a second discrete signal cable operatively connected to the plurality of generator sets, and a third discrete signal cable operatively connected to the plurality of generator sets. The control system may also include an arbitration relay disposed within the third discrete signal cable and being associated with a first of the plurality of generator sets, a switching device configured to selectively connect the first of the plurality of generator sets to the bus, and a control module connected to the first discrete signal cable, the second discrete signal cable, the third discrete signal cable, the arbitration relay, and the switching device. The control module may be configured to receive a group start signal and initiate startup of the first of the plurality of generator sets, and to generate a signal on the first discrete signal cable based on an operational status of the first of the plurality of generator sets. The control module may also be configured to determine if the second discrete signal cable is active, to activate the second discrete signal cable and the arbitration relay based on the determination, and to activate the switching device to connect the first of the plurality of generator sets to the bus based on a status of the third discrete signal cable on both sides of the arbitration relay.

Another aspect of the present disclosure is directed to a method of activating a power bus. The method may include receiving a group start signal and responsively initiating startup of a plurality of generator sets. The method may further include communicating to the plurality of generator sets an operational status of each of the plurality of generator sets, communicating to the plurality of generator sets a desire of a first of the plurality of generator sets to connect to the power bus, and inhibiting others of the plurality of generator sets from attempting to connect to the power bus based on the communicated desire. The method may also include interrupting an arbitration signal directed to the plurality of generator sets in series based on the communicated desire, and connecting the first of the plurality of generator sets to the power bus based on a status of the arbitration signal

DETAILED DESCRIPTION

Figure 1:
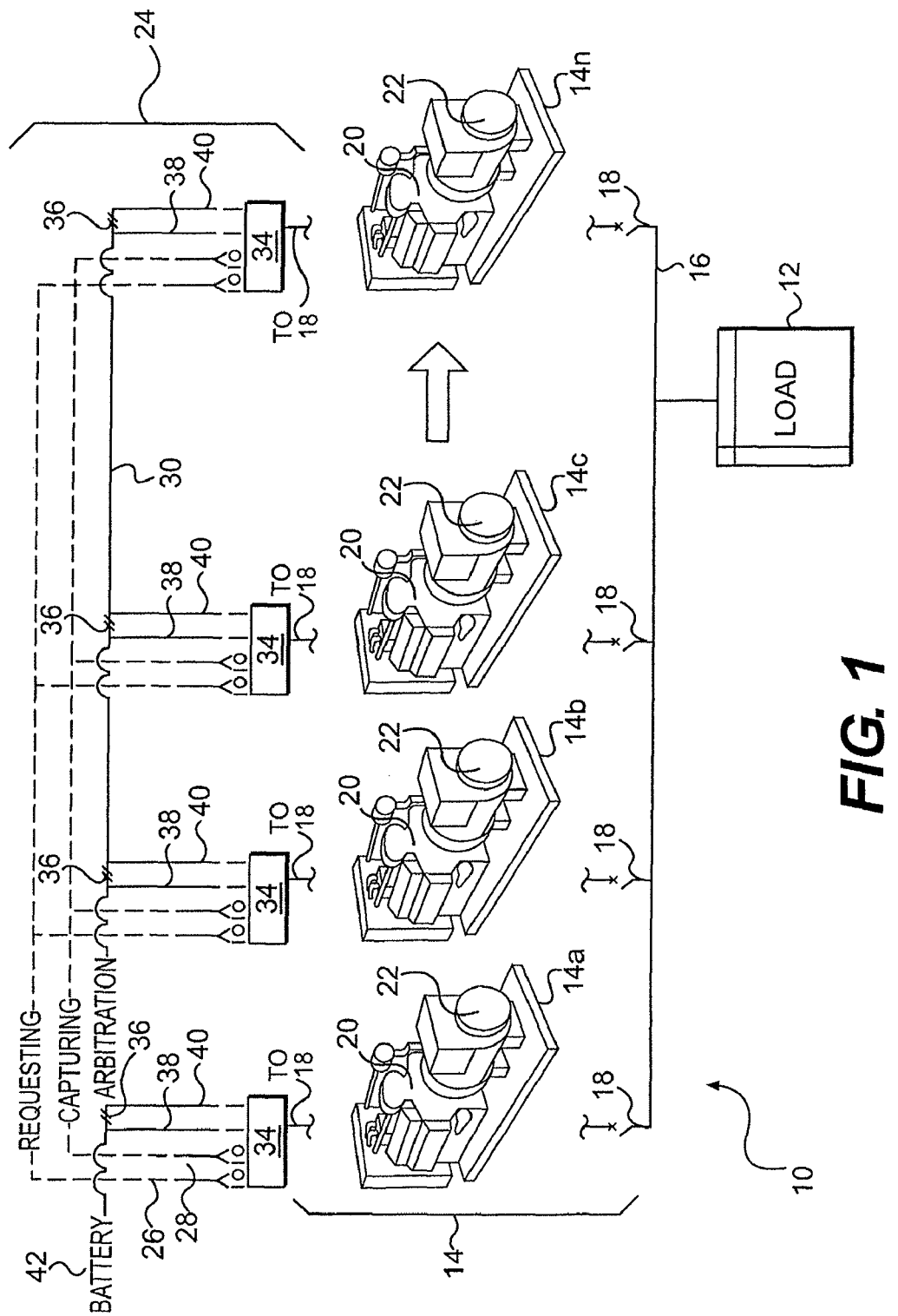
FIG. 1 is a schematic illustration of an exemplary disclosed power system.

FIG. 1 illustrates an exemplary power system 10 consistent with certain disclosed embodiments. Power system 10 may be configured to provide primary and/or backup power to an external load 12. In one exemplary embodiment, backup power may include an immediate supply of reserve power provided to external load 12 when power supplied from a utility power grid (not shown) is interrupted. As shown in FIG. 1, power system 10 may comprise a plurality of generator sets (gensets) 14, including gensets 14a, 14b, 14c, and 14n. Although intended for use with two or more gensets 14, it is contemplated that power system 10 may include any number of gensets 14. Gensets 14 may be connected to each other and connected to external load 12 by way of a power transmission network 16 and a plurality of connections 18.

External load 12 may include any type of power consuming system or device configured to receive electrical power supplied by gensets 14 and to utilize the electrical power to perform some type of task. External load 12 may include, for example, lights, motors, heating elements, electronic circuitry, refrigeration devices, air conditioning units, computer servers, etc. In one exemplary embodiment, external load 12 may include one or more systems and/or devices that utilize uninterrupted electrical power to perform one or more critical and/or sensitive tasks. For example, electrical loads 12 that utilize uninterrupted power may include those found in hospitals, airports, computer servers, telecommunication installations, and/or industrial applications.

Transmission network 16 may embody any electrical transmission system for distributing electrical power produced by gensets 14 to external load 12. For example, transmission network 16 may primarily comprise a power bus associated with one or more power stations, transmission lines, connection equipment (e.g., transformers, electrical switches, power relays, circuit breakers, and the like), and other suitable devices for distributing electrical power across a power grid. In one embodiment, portions of transmission network 16 may be buried underground and/or run overhead via transmission towers.

Connections 18 may include any type of electrical connector or system that is capable of coupling together one or more of gensets 14 and external load 12. For example, connection 18 may include various switching devices, junction boxes, circuit interrupting devices, fuses, or any other components that may be suitable for electrically interconnecting one or more systems. Connection 18 may also or alternatively include a voltage transformer and/or power synchronizer configured to reduce or otherwise condition the power provided by gensets 14 to a suitable level for use by conventional consumer devices.

Gensets 14 may each include components that operate to generate electricity. In one embodiment, each genset 14 may comprise a prime mover 20 coupled to mechanically rotate a generator 22 that provides electrical power to external load 12. For the purposes of this disclosure, prime mover 20 is depicted and described as a heat engine, for example, a combustion engine that combusts a mixture of fuel and air to produce the mechanical rotation. One skilled in the art will recognize that prime mover 20 may be any type of combustion engine such as, for example, a diesel engine, a gasoline engine, or a gaseous fuel-powered engine.

Generator 22 may be, for example, an AC induction generator, a permanent-magnet generator, an AC synchronous generator, or a switched-reluctance generator that is mechanically driven by prime mover 20 to produce electrical power. In one embodiment, generator 22 may include multiple pairings of poles (not shown), each pairing having three phases arranged on a circumference of a stator (not shown) to produce an alternating current. Electrical power produced by generator 22 may be directed for offboard purposes to external load 12.

It is contemplated that one or more of gensets 14 may be substantially different from one or more others of gensets 14 within the same power system 10. That is, one or more of gensets 14 may have a greater or lesser electrical power output capacity than another of gensets 14. Subsequently, gensets 14 may each be operated and controlled differently, depending on their respective electrical power output, if desired.

To help regulate operation of gensets 14 and their connection to external load 12, power system 10 may be provided with a control system 24. Control system 24 may include a plurality of discrete signal cables, for example, a requesting discrete signal (RDS) cable 26, a capturing discrete signal (CDS) cable 28, and an arbitration discrete signal (ADS) cable 30. Control system 24 may also include a plurality of control modules 34 operatively connected to cables 26-30 and to transmission network 16. In one embodiment, one control module 34 may be paired with and dedicated to controlling only one of gensets 14.

RDS cable 26 may extend between all of gensets 14 and be configured to transmit a signal from any one of gensets 14 to all other gensets 14 of the same power system 10 indicative of a status of the associated genset 14. That is, after receiving a group start command, each control module 34 may be configured to initiate startup and monitor a status of its associated genset 14. The status may be related to an output of prime mover 20, for example a speed and/or a torque produced by prime mover 20. Alternatively or additionally, the status may be related to an output of generator 22, for example a current, a voltage, a frequency, and/or a phase of electricity produced by generator 22. When the status of the associated genset 14 substantially matches a desired status (i.e., when the output of genset 14 is suitable for providing power to transmission network 16), control module 34 may energize RDS cable 26, thereby indicating to other control modules 34 a readiness of its associated genset 14 and requesting the right to connect to transmission network 16 and provide electrical power to external load 12. Similar, control module 34 may recognize via RDS cable 26 when another genset 14 is ready to connect to transmission network 16 and provide electrical power to external load 12. It is contemplated, however, that while control module 34 may recognize that another control module 34 has energized RDS cable 26, it may not be possible to determine which control module 34 has done the energizing.

Similarly, CDS cable 28 may extend between all of gensets 14 and be configured to transmit a signal from any one of gensets 14 to all other gensets 14 of the same power system 10 indicative of an intent to be the first to provide electrical power to (i.e., to capture) transmission network 16. The first genset 14 to energize RDS cable 26 may be the genset 14 that also energizes CDS cable 28. When CDS cable 28 is energized by a first genset 14, all other gensets 14 may enter and remain in a standby mode of operation, while the first genset 14 attempts to capture transmission network 16. If for some reason the first genset 14 cannot connect to transmission network 16, another genset 14 that has already energized RDS cable 26 may then energize CDS cable 28 and be allowed to connect to transmission network 16. When one control module 34 energizes CDS cable 28, it may then release (i.e., stop energizing) RDS cable 26. Likewise, when one genset 14 fails to connect to transmission network 18, the associated control module 34 may release CDS cable 28 and re-energize RDS cable 26 for another attempt.

In some situations, it may be possible for multiple gensets 14 to simultaneously energize CDS cable 28. In these situations, components associated with ADS cable 30 may help ensure that only one genset 14 connects or attempts to connect to transmission network 16 at a given time. Specifically, a plurality of arbitration relays 36 may be connected to ADS cable 30 in series, one arbitration relay 36 associated with each genset 14. Each genset 14 may be connected to ADS cable 30 by way of a leading cable 38 and a trailing cable 40 located to either side of arbitration relay 36 such that arbitration relay 36, when closed, may provide battery power to both leading cable 38 and trailing cable 40. Arbitration relays 36 may be normally-closed, such that power from a battery source 42 may be observed along an entire length of ADS cable 30 when arbitration relays 36 are in a non-activated state. When activated, arbitration relays 36 may interrupt power along ADS cable 30 at the genset 14 location whose paired control module 34 is performing the activation.

When one or more control modules 34 have simultaneously energized CDS cable 28, they may each then activate (i.e., cause to open) their associated arbitration relay 36, thereby interrupting the power along ADS cable 30. When arbitration relays 36 are activated, the furthest upstream control module 34 (relative to battery source 42) may still observe power on leading cable 38 (i.e., a pre-arbitration relay status may be "active"), but not on trailing cable 40 (i.e., a postarbitration relay status may be "inactive"). Further, when arbitration relays 36 are activated, the remaining upstream gensets 14 may experience power on both leading and trailing cables 38, 40 (i.e., both the pre- and post-arbitration relay statuses may be "active"), while downstream gensets 14 may experience no power on either of leading or trailing cables 38, 40 (i.e., both the pre- and post-arbitration relay statuses may be "inactive"). And, the one control module 34 observing an active pre-arbitration relay status and an inactive post-arbitration relay status (i.e., the furthest upstream control module 34 that has activated its arbitration relay 36) may be allowed to connect to transmission network 16.

In some situations, a time delay may be associated with energizing of CDS cable 28, activation of arbitration relay 36, and/or with connection to transmission network 16 (i.e., with closing of connection 18). For example, control module 34 may be required to delay a time period after energizing CDS cable 28 and before activating arbitration relay 36, and/or after activating arbitration relay 36 and before connecting to transmission network 16. During these time periods, control module 34 may continue to monitor operation of prime mover 20, generator 22, RDS cable 26, CDS cable 28, ADS cable 30, and/or arbitration relay 36. And, in some situations, if the monitored operation changes undesirably during this time period, control module 34 may inhibit the closing of connection 18. For example, after activation of arbitration relay 36, if the pre- or post-arbitration relay status were to change during the delay time period, control module 34 may determine that a failure has occurred and abort connection to transmission network 16 (i.e., control module 34 may inhibit closing of connection 18 and release arbitration relay 36, CDS cable 28, and RDS cable 26).

Each of control modules 34 may be configured to detect signals on any one of cables 26, 28, 38, and 40 to regulate operation of its paired genset 14 in response to the detected signals, and to generate signals on cables 26 and 28 directed to other gensets 14 within the same power system 10. Each control module 34 may embody a single or multiple microprocessors, field programmable gate arrays (FPGAs), digital signal processors (DSPs), etc. that include a means for controlling an operation of its paired genset 14 in response to various input. Numerous commercially available microprocessors can be configured to perform the functions of control module 34. Various other known circuits may be associated with control module 34, including power monitoring circuitry, power supply circuitry, signal-conditioning circuitry, actuator driver circuitry (i.e., circuitry powering solenoids, motors, or piezo actuators), communication circuitry, and other appropriate circuitry.

According to one embodiment, each control module 34 may be configured to adjust or change the operational status of its paired genset 14 based on signals detected on any one of cables 26, 28, 38, 40. For example, in response to a group start signal, each control module 34 may trigger its paired genset 14 to power up in preparation for supplying power to external load 12 (i.e., each control module 34 may prepare its paired genset 14 to come online). At this time, transmission network 16 may be a dead bus (i.e., no power may be observed on transmission network 16). Once each genset 14 is prepared to come online, the paired control module 34 may energize RDS cable 26 indicating readiness to provide electrical power. After energizing RDS cable 26, each control module 34 may then attempt to be the first to energize CDS cable 28 (i.e., control module may attempt to capture transmission network 16). Further, in response to being the first to energize CDS cable 28 (or one of the first that simultaneously energize CDS cable 28), control module 34 may activate its associated arbitration relay 36 to ensure that only one genset 14 is allowed to initially power transmission network 16. If during this process, control module 34 observes that CDS cable 28 has already been energized by another genset 14, control module 34 may then cause its genset to enter either a standby mode of operation (if no power is yet on transmission network 16) or a synchronizing mode of operation (if power is already on transmission network 16). Once arbitration relay 36 has been activated, if control module 34 observes battery power on leading cable 38 and not on trailing cable 40 (i.e., if the pre-arbitration status is active and the post-arbitration status is inactive), control module 34 may then connect its paired genset 14 to transmission network 16 by closing connection 18.

Figure 2:
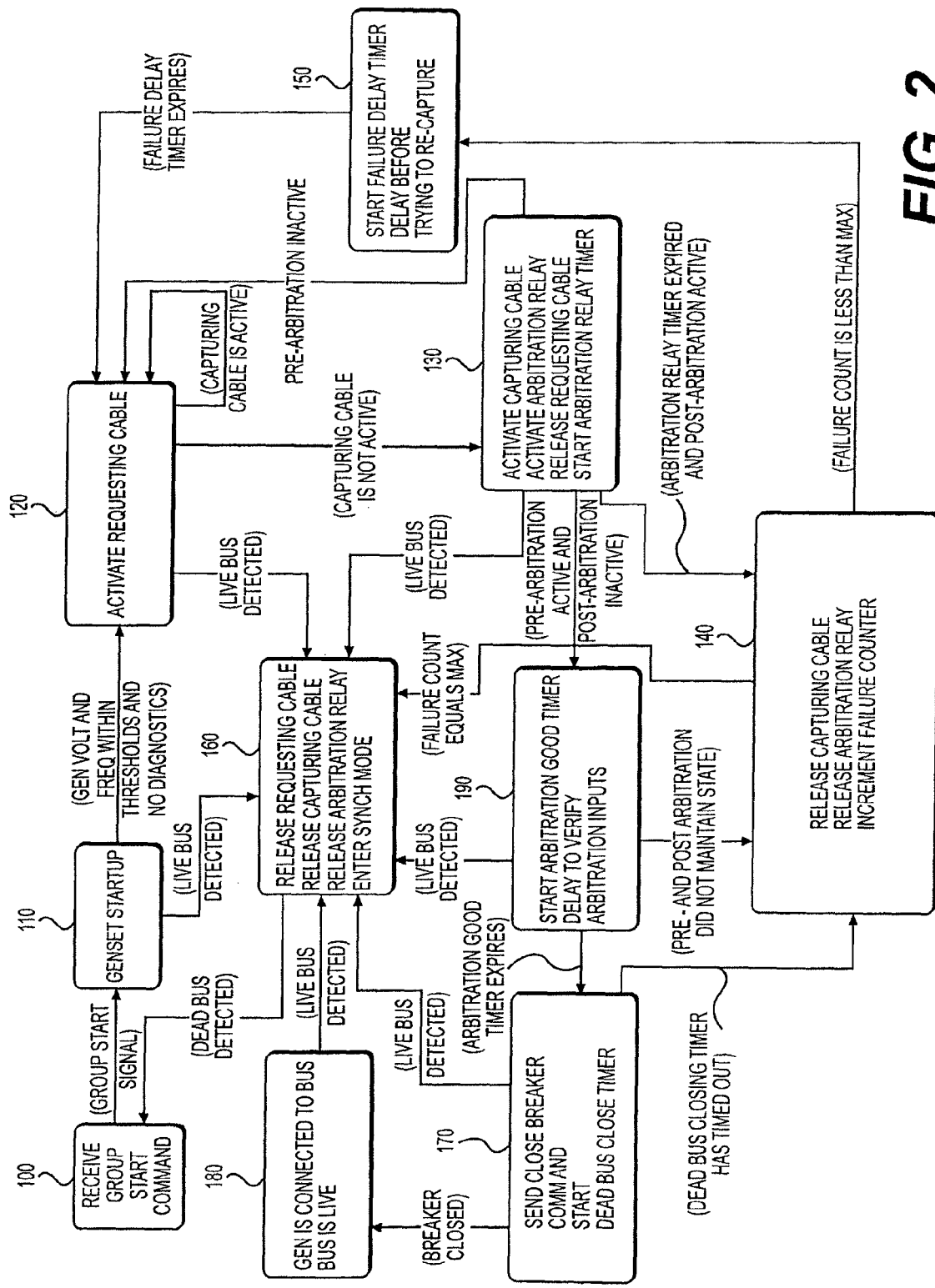
FIG. 2 is flowchart depicting an exemplary disclosed method of operating the power system of FIG. 1.

FIG. 2 illustrates an exemplary operation of power system 10. FIG. 2 will be discussed in more detail in the following section to further illustrate the disclosed concepts.

INDUSTRIAL APPLICABILITY

The disclosed control system may provide electrical power to an external load in a low cost, simple manner. In particular, the disclosed power system may utilize multiple independent control modules to selectively and quickly power a dead bus in a controlled manner. The multiple independent control modules may have a lower cost and complexity than a single master controller, and help create modularity in the power system that allows for easy capacity expansion and retraction. FIG. 2 illustrates a flowchart depicting an exemplary method for powering transmission network 16 to provide varying levels of power to external load 12. FIG. 2 will now be discussed in detail.

During operation of power system 10, each control module 34 may receive a group start command (Step 100). The group start command may be sent manually or automatically based on a demand of external load 12. Following receipt of the group start command, and in some situations following expiration of a delay time period, each control module 34 may cause its associated genset 14 to startup (Step 110). Control module 34 may then monitor operation of genset 14 to determine a readiness to provide electrical power to transmission network 16. For example, control module 34 may monitor a voltage and frequency of generator 22 to determine if operation of genset 14 is within a desired range and no diagnostic flags have been generated. When genset 14 is ready to provide electrical power to external load 12, control module 34 may energize (i.e., activate) RDS cable 26 indicating the readiness (Step 120).

Following step 120, control module 34 may check a status of CDS cable 28. If CDS cable 28 is already active, control module 34 may cause its paired genset to enter the standby mode of operation and continue to cycle through step 120. However, if following step 120, control module 34 determines that CDS cable 28 is inactive, control module 34 may attempt to capture transmission network 16. That is, control module 34 may activate CDS cable 28, activate arbitration relay 36, release RDS cable 26, and start an arbitration relay timer (Step 130). When arbitration relay 36 is activated, control module 34 should observe battery power on leading cable 38 (i.e., control module 34 should observe a pre-arbitration relay status being active), but not on trailing cable 40 (i.e., control module 34 should observe a post-arbitration relay status being inactive). Thus, if following step 130 control module 34 does not observe the pre-arbitration relay status being active, control module 34 may determine that arbitration has been lost and return control to step 120.

If following step 130 control module 34 observes battery power on trailing cable 40 or if the arbitration timer has elapsed and connection to transmission network 16 has been unsuccessful, control module 34 may determine that a failure has occurred. That is, control module 34 may determine that a failure occurred during arbitration or during an attempt to close connection 18. In either of these situations, control module 34 may release CDS cable 28, release arbitration relay 36, and increment an internal failure counter (Step 140). During step 140, control module 34 may monitor the failure counter and respond accordingly. That is, if the failure count is less than a maximum number, control module 34 may return to step 120. In some situations, a delay may be incurred before retrying to capture transmission network 16 (Step 150). However, if the failure count exceeds the maximum number, control module 34 may exit the control strategy by releasing RDS cable 26, CDS cable 28, and arbitration relay 36, and will cease the attempt to close connection 18 until a live bus is detected, at which point the unit will enter synchronization mode of operation (Step 160).

Following step 130, control module 34 may attempt to connect genset 14 to transmission network 16. Specifically, control module 34 may send a close breaker command to connection 18, and start a dead bus close timer (Step 170). If the dead bus close timer expires and connection 18 has not been closed, control module 34 may again determine a failure has occurred and return to step 140. Otherwise, connection 18 may be closed and power provided to transmission network 16 (Step 190).

In some situations, following step 130 and before completion of step 170, an additional delay may be implemented to verify a status of leading and trailing cables 38, 40. In particular, an arbitration good timer may be started before the closing of connection 18 is completed (Step 190). And, should either of the pre- or post-arbitration statuses change during this time, control module 34 may again determine that a failure has occurred and return control to step 140.

At any point in time throughout the completion of steps 110-190, control module 34 may determine that transmission network 16 is no longer dead (i.e., that transmission network 16 has been energized by another genset 14 or by the current genset 14). In this situation, control module 34 may return control to step 160. And, if transmission network 16 subsequently loses power, control may return to step 100.

Many advantages may be associated with the disclosed control system. Specifically, because of the simplicity of the disclosed control system (i.e., because of the use of hard-wired discrete signal cable control), the control complexity of the system may be reduced, while improving a time required to energize a dead bus after first receiving a start command. The reduced complexity of the system may facilitate trouble shooting while lowering a cost of the system. Further, the disclosed control system may provide a backup strategy should one genset 14 fail to connect to the dead bus (i.e., see step 140).

It will be apparent to those skilled in the art that various modifications and variations can be made in the disclosed control system without departing from the scope of the disclosure. Other embodiments of the disclosed control system will be apparent to those skilled in the art from consideration of the specification and practice of the control system disclosed herein. For example, it is considered that one or more of steps 110-190 may be accomplished manually, while others of steps 100-190 may be completed automatically. In one particular embodiment, step 110 and/or step 170 may be completed manually for one or more of gensets 14 of a power system 10. It is intended that the specification and examples be considered as exemplary only, with a true scope of the disclosure being indicated by the following claims.

What is claimed is:

1. A method of activating a power bus, the method comprising:
  receiving a group start signal and responsively initiating startup of a plurality of generator sets;
  communicating to the plurality of generator sets an operational status of each of the plurality of generator sets;
  communicating to the plurality of generator sets a desire of at least two of the plurality of generator sets to connect to the power bus;
  inhibiting the remaining of the plurality of generator sets from attempting to connect to the power bus based on the communicated desire;
  activating an arbitration relay at the locations of the at least two generator sets based on the communicated desire, the arbitration relays being connected in series along an arbitration signal cable directed to the plurality of generator sets;
  interrupting power along the arbitration signal cable at the locations of the activated arbitration relays; and
  connecting one of the at least two generator sets to the power bus based on a status of the arbitration signal cable.

2. The method of claim 1, wherein the operational status is associated with a voltage and a frequency output.

3. The method of claim 1, further including:
  detecting when the power bus has already been activated by one of the plurality of generator sets; and
  responsively causing the remaining of the plurality of generator sets to enter a synchronization mode of operation.

4. The method of claim 1, wherein the status of the arbitration signal cable is associated with a location of the interruption relative to the plurality of generator sets.

5. The method of claim 4, further including connecting the one of the at least two generator sets to the power bus only when the interruption occurs at the one of the at least two generator sets.

6. The method of claim 5, further including inhibiting the one of the at least two generator sets from connecting to the power bus when the location of interruption occurs at another of the at least two generator sets.

7. The method of claim 5, further including delaying a time period after interrupting the arbitration signal cable and before connecting the one of the at least two generator sets to the power bus.

8. The method of claim 7, further including determining a failure has occurred and inhibiting connection of the one of the at least two generator sets when a status of the arbitration signal cable changes during the time period.

* * * * *